Feb. 10, 1953 J. J. DE MUTH 2,628,316

PHOTOELECTRIC CELL COUPLING CIRCUIT

Filed Nov. 25, 1949

INVENTOR.
John J. DeMuth
BY

ATTORNEY.

Patented Feb. 10, 1953 2,628,316

UNITED STATES PATENT OFFICE 2,628,316

PHOTOELECTRIC CELL COUPLING CIRCUIT

John J. De Muth, Burbank, Calif., assignor to Radio Corporation of America, a corporation of Delaware Application November 25, 1949, Serial No. 129,376

5 Claims. (Cl. 250—209)

This invention relates to coupling circuits between photoelectric cells and an amplifier, and particularly relates to a coupling circuit in which the individual phototube outputs may be made equal and maintained equal when connected in either a parallel or a push-pull arrangement.

The use of switching circuits for connecting photoelectric cells for the reproduction of a standard sound record or of a push-pull sound record are well-known, reference being made to Belar U. S. Patents No. 2,152,173 of March 28, 1939, and No. 2,178,219 of October 31, 1939, these circuits showing the outputs of the cells being connected to transformers, to a pair of push-pull amplifier tubes, and to a single amplifier tube. The present invention is directed to the same general type of circuit, but differs therefrom in that it incorporates all the features shown in the various circuits of the references which show only one or two of the features in any one circuit, but not all of them in a single coupling circuit to an unbalanced line. For instance, the present invention provides the usual direct current voltage control on the cells in either parallel or push-pull connections, and thus provides the important alternating current balance in either position. Furthermore, the same impedance at the input of an unbalanced line is provided in either type of connection, which permits the circuit to have a constant high frequency response in either position. Certain of these features are found in the prior circuits connected to unbalanced lines, balance being more easily obtainable with balanced circuits, but no prior unbalanced line circuit provides all of the features in a simple manner with the minimum of circuit elements, as disclosed hereinafter. The circuit is particularly useful in sound film reproduction or in a photoelectric cell monitoring system for a film recorder.

The principal object of the invention, therefore, is to facilitate the interconnection of a pair of photoelectric cells with an amplifier in either a parallel or a push-pull relationship.

Another object of the invention is to provide an improved switching circuit between a pair of photoelectric cells and a single ended line.

A further object of the invention is to provide a single, double pole, double throw switching circuit between a pair of photoelectric cells and an unbalanced line in which the polarizing voltage remains unchanged and the alternating current load impedance remains the same at all times to obtain constant high frequency response.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
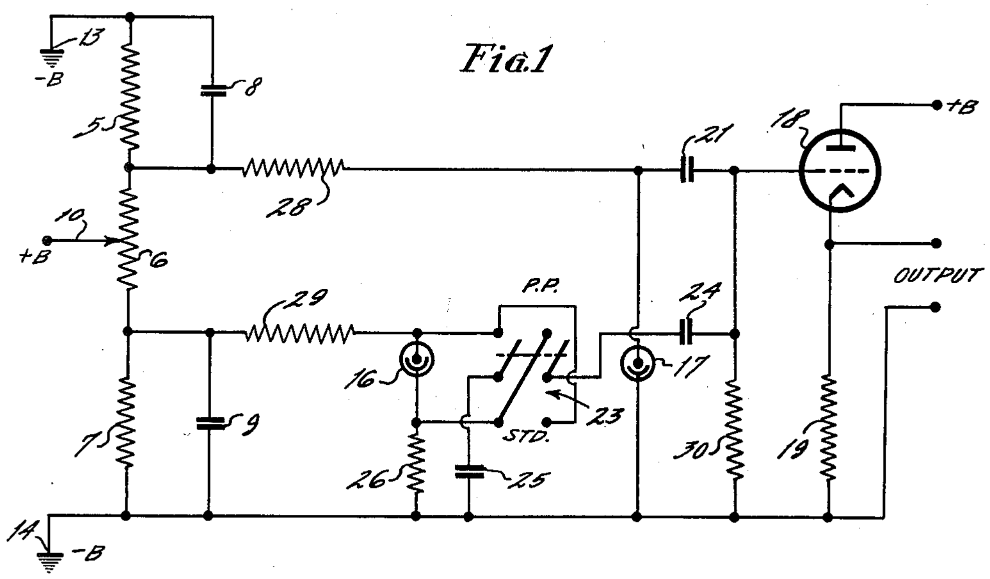
Fig. 1 is a schematic drawing of the complete circuit embodying the invention and switch.

Referring now to the drawings, in which the same numerals identify like elements, a voltage divider, or balancing network, includes resistors 5, 6, and 7 and condensers 8 and 9, the B plus connection being made by a slider 10. Ground and B minus are at 13 and 14 and are connected to the ends of the network. Two photoelectric cells 16 and 17, which may be separate cells or two cells, contained in a single envelope, are shown, the cells being connected to an amplifier tube 18 having a cathode-follower output over a resistor 19.

Figure 2:
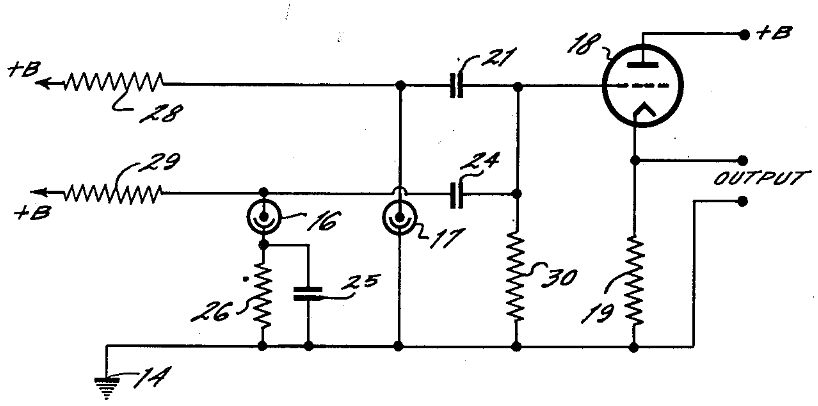
Fig. 2 is a simplified schematic diagram showing the circuit of Fig. 1 when the switch is in one position.

The photoelectric cell 17 is coupled by condenser 21 to the grid of tube 18, this connection remaining fixed during the switching operation by a switch 23. When the switch 23 is thrown to its lower position, which is referred to as the standard position, the photoelectric cell 16 is coupled over condenser 24 to the grid of tube 18, the two cells 16 and 17 thus being connected in parallel to the tube 18, as shown in Fig. 2. Also, when the switch 23 is in its lower or standard position, a condenser 25 is connected in shunt across the cathode resistor 26 of photoelectric cell 16, which effectively short-circuits the resistor 26 as far as alternating current output is concerned, since it effectively places the cathode of photoelectric cell 16 at ground alternating current potential. Loading resistors 28 and 29 are connected from the potential divider to the anodes of the respective photoelectric cells, while resistor 30 provides the terminating resistance for the network and the grid bias for the tube 18.

When the switch 23 is thrown to its upper or push-pull position, the anode of cell 16 is connected to condenser 25 and the cathode of the cell is connected to condenser 24. Thus, with increasing light on cell 17 and decreasing light on cell 16, or vice versa, the cell outputs will be additive vectorially.

For good balance, resistor 29 should equal resistor 26, and resistor 28 should be approximately equal to resistor 29 or 26. To obtain equal photoelectric cell outputs, the direct current potentials on photoelectric cells 16 and 17 may be adjusted by slider 10. With this type of circuit, it is possible to adjust photoelectric cells 16 and 17 to have equal outputs when connected in the standard position and with a push-pull input. Under these conditions, adjustment is made so that there is a cancelation of photoelectric cell outputs on the grid of tube 18. The switch 23 may then be thrown to the push-pull position with the knowledge that the potentiometer slider 10 is properly adjusted for the reproduction of the push-pull track. This is accomplished by taking the alternating current output of cell 16 from its cathode instead of its anode and placing the anode at alternating current ground potential by means of condenser 25, as mentioned above. It will be seen that the alternating current load remains the same for either position of the switch if resistor 29 equals resistor 26. The direct current potential on the cell 16 remains unchanged when switch 23 is in either position.

Figure 3:
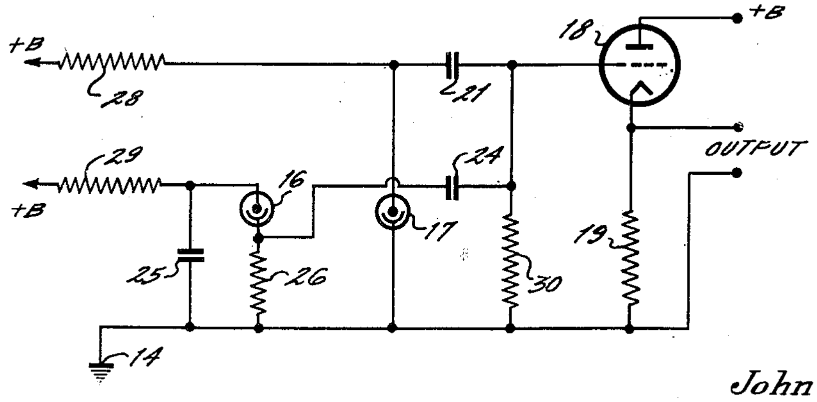
Fig. 3 is a simplified schematic diagram showing the circuit of Fig. 1 when the switch is in a second position.

For the reproduction of standard tracks, the switch 23 is thrown to its upper or push-pull position, as shown in Fig. 3, and the potentiometer slider 10 is then adjusted for substantially zero input to the amplifier from both cells, since the output from one cell is equal to and in phase opposition to the output from the other cell, By then returning the switch to the standard position, the cells will provide equal outputs from both sides of the standard track, since this type of circuit does not upset the polarizing voltages to the cells or the alternating current loads connected to the cells when switched from push-pull to standard position, or vice versa.

Although the invention has been described with a cathode-follower amplifier, it is to be understood that the circuit can be coupled to any unbalanced line, such as a two-terminal transformer, low capacity cable, or standard amplifier.

I claim:

1. A photoelectric cell coupling circuit comprising a pair of photoelectric cells, an amplifier, means for adjusting the direct current potentials on the anodes of said cells, a switching circuit, a condenser, and means for coupling the anode of one of said cells to said amplifier, one position of said switching circuit including coupling means for coupling the anode of the other of said cells to said amplifier, and placing said condenser directly between the cathode of said other cell and ground, and another position of said switching circuit connecting the cathode of said other cell to said amplifier and placing said condenser directly between the anode of said other cell and ground.

2. A photoelectric cell coupling circuit comprising a pair of photoelectric cells, an amplifier, means for adjusting the direct current potentials on the anodes of said cells, a switching circuit, means for coupling the anode of one of said cells to said amplifier, one position of said switching circuit including coupling means for coupling the anode of the other of said cells to said amplifier, and placing the cathode of said other cell at alternating current ground potential, and another position of said switching circuit connecting the cathode of said other cell to said amplifier and placing the anode of said other cell at alternating current ground potential, said first mentioned coupling means being a condenser fixedly connected between the anode of said one cell and said amplifier and the coupling means of said switching circuit for placing said anode and cathode of said other cell at alternating ground potential being a condenser connected directly between said anode and ground in said first mentioned position of said switching circuit and directly between said cathode and ground in said other position of said switching circuit.

3. A photoelectric cell coupling circuit comprising a pair of photoelectric cells, an amplifier, means for adjusting the direct current potentials on the anodes of said cells, a switching circuit, and means for coupling the anode of one of said cells to said amplifier, one position of said switching circuit including coupling means for coupling the anode of the other of said cells to said amplifier, and placing the cathode of said other cell at alternating current ground potential, and another position of said switching circuit connecting the cathode of said other cell to said amplifier and placing the anode of said other cell at alternating current ground potential, said amplifier having a cathode-follower output circuit.

4. A photoelectric cell coupling circuit comprising a pair of photoelectric cells, an amplifier for amplifying the output of said cells, a switching circuit for connecting said cells in parallel and in push-pull to said amplifier, a resistor connected between the cathode of one of said cells and ground, and a condenser adapted to be connected between said ground and either the cathode or anode of said one cell, said condenser being connected between said ground potential and the cathode of said other cell when said switching circuit has connected said cells in parallel to said amplifier and said condenser being connected between said ground potential and the anode of said other cell when said switching circuit has connected said cells in push-pull to said amplifier.

5. A photoelectric cell coupling circuit in accordance with claim 4, in which said switching circuit includes a double pole, double throw switch connected to the anode and cathode of said other cell, and a second condenser connected to said switch.

JOHN J. DE MUTH.

REFERENCES CITED

The following references are of record in the file of this patent:

UNITED STATES PATENTS

| Number | Name | Date |
|---|---|---|
| 2,065,758 | Shepard | Dec. 29, 1936 |
| 2,287,965 | Borberg | June 30, 1942 |
| 2,459,293 | Shonnard | Jan. 18, 1949 |